Original Patent Dated
Feb. 22. 1869
Alarm and Registering Punch for Railroad Conductors.
Austin D. Hoffman.
4246 Chicago, Ill. REISSUED JAN 31 1871
Fig. I.
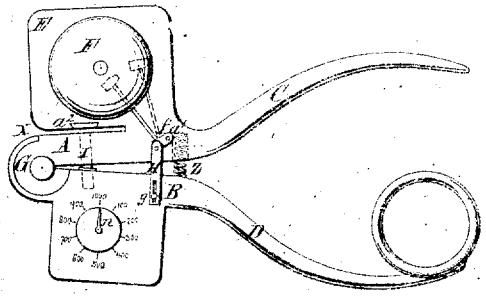
Fig. III.
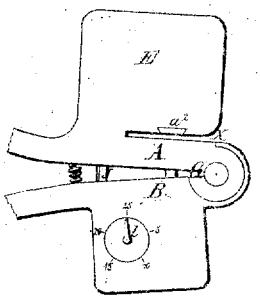
Fig. II.
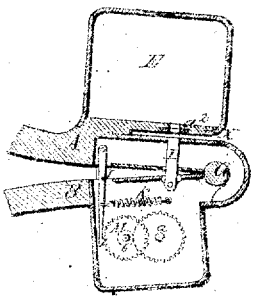
Fig. V.
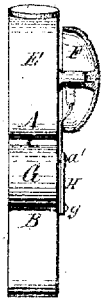
Fig. IV.
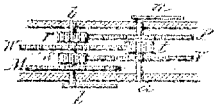
Edward Wheelus
W. H. Sheridan } Witnesses
Austin D. Hoffman Inventor
by Forbush & Fyfe
Attys

UNITED STATES PATENT OFFICE.

AUSTIN D. HOFFMAN, OF CHICAGO, ILLINOIS, ASSIGNOR, BY MESNE ASSIGNMENTS, TO JAMES H. SMALL, OF BUFFALO, NEW YORK.

IMPROVEMENT IN REGISTERING TICKET-PUNCHES.

Specification forming part of Letters Patent No. 100,936, dated February 22, 1870; reissue No. 4,246, dated January 31, 1871.

*To all whom it may concern:*

Be it known that I, AUSTIN D. HOFFMAN of the city of Chicago, in the county of Cook and State of Illinois, have invented an Alarm and Registering Punch for Railroad-Conductors, of which the following is a specification:

The object of my invention is to provide improved means which shall serve as a check to prevent conductors on cars, omnibuses, and other conveyances from making false returns and thus defrauding the company employing them.

A company may thus be defrauded in various ways, such, for instance, as the appropriation by the conductor of cash fares collected by him, or by the conductor colluding with certain passengers, and omitting to perforate tickets held by them, whereby such passengers are permitted to make several trips over the same route for the price of one fare. To prevent this fraud conductors have been required to give to each passenger from whom a cash fare is collected a ticket, and to perforate the same, by means of a punch, before its delivery, the conductor being charged with the number of tickets delivered to him and credited with those returned unperforated. The neglect of the conductor to thus perforate and deliver a ticket to the passenger from whom he has collected a fare would attract the attention of the passengers, and sooner or later lead to detection. The perforated tickets thus given to the passengers, being by them generally thrown away in the car or other vehicle, can afterward be collected by the conductor, and delivered to other passengers after a pretended operation of perforating them.

In the same manner a multiple-ride ticket in the possession of a passenger in collusion with the conductor may be handed to the latter, who simply pretends to punch the same, and then returns it to the owner, which operation can evidently be repeated with the same ticket any desired number of times.

Previous to my invention a locked box, attached to one of the jaws of a punch, had been employed to receive the cuttings, which indicated, when counted, the number of fares received during the day.

My invention consists, first, in the combination, with a punch, of a bell, which is rung each time the former is operated, thereby calling the attention of passengers to the conductor, and notifying them to be ready with their fares, while a neglect of the conductor to operate the punch during the collection of a fare becomes manifest from the bell not ringing; second, in the arrangement, in a ticket-punch, of the bell and the mode of operating it; third, in the combination, in a punch, of a box to receive the cuttings, and a registering device, the contents of the former indicating the kinds of tickets and the portions thereof from which the cuttings were punched, and the latter showing the number of times the punch has been operated; fourth, in the combination, in a punch, of a box to receive the cuttings, a registering device, and a bell, the latter being rung and a record made each time the punch is operated, whereby the conductor becomes chargeable with a fare each time the bell is rung, while the character of the cuttings in the box will indicate the number of cash fares received and the number of fares paid by tickets, and the nature of the latter.

In the accompanying drawings, Figure I is an elevation of my improved punch. Fig. II is a section, showing an internal view of the registering mechanism and the box for the cuttings. Fig. III is an elevation of the opposite side of the jaws from that shown in Fig. I. Fig. IV is an elevation of the gearing of the registering device detached from the case. Fig. V is an end elevation of the punch with the bell in section.

Like letters of reference designate like parts in each of the figures.

A B represent the two jaws of the punch, jointed together at their ends at G, and having a slot, $x$, formed in the jaw A, in which the tickets are inserted preparatory to being punched. C D are, respectively, the handles of the jaws A B. I is the punch or perforating-rod attached to the jaw B, and fitting and working through a hole in jaw A, and against a perforated stop-piece, $a^2$, in the opposite side of the slot $x$, so as to perforate a card placed in the slot in the usual manner. E is the box for the cuttings, attached to or formed with the jaw A, as shown, or in any other suitable manner, so as to receive and hold the clippings as they are punched from the tickets. F is the bell, attached to one side of the box E, as shown in Fig. I. The bell-hammer is attached to a bell-crank or T-shaped shank, *f*, which is pivoted to the side of the jaw A at $a^1$, while the other arm of the lever or shank is jointed to the end of a thrust-arm, H, the opposite end of which is attached to the side of the jaw B by a pin, *g*, fitting in a slot in the arm. In closing the jaws of the punch the arm H causes the bell-hammer to oscillate and strike the bell, as shown in dotted lines in Fig. I, the slot in the arm permitting a slight play of the parts, thereby causing the bell to ring each time the jaws are closed. The jaws are held apart, in their normal position, by means of a coiled coiled spring, Z, inserted in a socket in one jaw, and made to bear against the other, so as to prevent the punch I from projecting into the slot *x* and obstructing the same when a ticket is being inserted. The jaw B is provided with a rim and two face-plates, which form a suitable case and bearings for the registering mechanism, which is mounted on two journals, *a b*, that have their bearings in the face-plates of the jaw. M is a ratchet-wheel, fixed on journal *b*, and turned one notch every time the jaws A B are opened by means of a pulling-pawl, J, pivoted in or to the jaw A, and extending into the case of jaw B, so as to engage with wheel M, against which it is held by a spring, *k*, as shown in Fig. II. *s* is a pinion, rigidly mounted on the journal *b*, so as to engage with and turn a wheel, V, which runs loosely on journal *a*, and carries with it a pinion, *t*, that drives a wheel, W, fitted loosely on journal *b*. A pinion, *r*, is attached to wheel W, and drives a wheel, *p*, rigidly mounted on journal *a*. On opposite sides of the face plates of jaw B hands or pointers, *l n*, are, respectively, attached to the ends of the arbors *b a*. A dial, surrounding the index *l*, is marked to correspond with the number of teeth (twenty-five) in wheel M, and will indicate the number of holes punched up to twenty-five, as represented in Fig. III. The dial of pointer *n* is graduated, so that the latter will move over one space during each revolution of the index *l* in the ordinary manner of registering devices, said dial being represented as numbered up to one thousand. The case containing the registering mechanism is closed, as shown, so as to be inaccessible to the conductor.

In using my improved punch, the person collecting the fares will be required to perforate a ticket for each fare or passenger, either the ticket held by the passenger or the ticket given to him by the collector in exchange for a cash fare. As the ringing of the bell necessarily attends every opening and closing of the jaws an omission to use the punch would attract the attention of the passengers and lead to detection. Being thus compelled to operate the jaws, and as the movement of the latter also actuates the registering device, as well as the bell, and as the collector will be required to account for the number of fares indicated by the register, he can gain nothing by omitting to punch the ticket when he works the jaw for ringing the bell, except when multiple-ride tickets are employed, as he will be charged by the register with the fare the same as if he had actually perforated the ticket. With multiple-ride tickets, however, while the collector would be charged with the number of fares indicated by the register, to which, of course, he has no access, yet he might, by using the cash-fare tickets a second time, falsely represent that more of said fares were from multiple-ride tickets than was actually the case, which would reduce by so much the number of cash fares that he is required to account for. The employment of the box E for receiving the punch-cuttings will, in such cases, expose this fraud, as the difference in the color or character of the cuttings of the different tickets enables the number of each kind of fare and tickets to be readily ascertained by assorting and counting such cuttings, while the entire number must correspond with the number indicated by the register.

What I claim as my invention is—

1. The combination, with a ticket-punch, of a bell, connected with the moving parts of the punch, so as to be rung each time the latter is operated, substantially as and for the purpose hereinbefore set forth.

2. The arrangement, in a ticket-punch, of the jaw A, bell F, bell-hammer *c*, bell-crank *f*, push-rod H, and jaw B, so as to operate as hereinbefore shown and described.

3. The combination, in a ticket-punch, of the box E, for the cuttings, with a registering device, which shall indicate the number of times the jaws are actuated, substantially as hereinbefore set forth.

4. The combination, in a ticket-punch, of a bell, a registering device, and a box to receive the cuttings, arranged so as to operate as hereinbefore set forth.

AUSTIN D. HOFFMAN.

Witnesses:
G. L. CHAPIN,
CHAS. W. ROGERS.